United States Patent

Mesmer

[11] Patent Number: 6,112,507
[45] Date of Patent: Sep. 5, 2000

[54] APPARATUS AND METHOD FOR REGULATING THE BALING FORCE IN A SQUARE BALER

[75] Inventor: Denis Mesmer, Bouzonville, France

[73] Assignee: Usines Claas France, Metz, France

[21] Appl. No.: 09/072,329

[22] Filed: May 4, 1998

[30] Foreign Application Priority Data

May 5, 1997 [DE] Germany .................... 197 18 579

[51] Int. Cl.⁷ ................................................ A01D 75/28
[52] U.S. Cl. .......................... 56/10.2 A; 56/341; 100/88
[58] Field of Search .................. 56/10.2 A, 10.2 R, 56/341, 343, 432, 433, DIG. 15; 100/88, 99, 50, 100

[56] References Cited

U.S. PATENT DOCUMENTS

| | | | |
|---|---|---|---|
| 4,951,452 | 8/1990 | Lundahl et al. | 56/341 |
| 5,913,801 | 6/1999 | Bottinger et al. | 56/10.2 R |

FOREIGN PATENT DOCUMENTS

| | | | |
|---|---|---|---|
| 0 235 397 B1 | 2/1990 | European Pat. Off. | A01F 15/08 |
| 0 382 263 A2 | 8/1990 | European Pat. Off. | A01F 15/04 |
| 29 53 438 A1 | 2/1982 | Germany | A01F 15/08 |
| 287 188 A5 | 2/1991 | Germany | A01F 15/04 |
| 91 08 469 | 10/1991 | Germany | A01F 15/08 |

*Primary Examiner*—Robert E. Pezzuto
*Attorney, Agent, or Firm*—Husch & Eppenberger, LLC; Robert E. Muir

[57] ABSTRACT

A square baler has a pick-up device, a feeding channel, a baling chamber with a baling ram, side walls of the baling chamber, a hydraulic adjustment device to change the position of at least one pivotal side wall and corresponding sensors and control devices, which regulate the side walls. A control device regulates the baling force of the square baler. A pressure sensor measures the baling pressure in the hydraulic adjustment device. The baling pressure is then compared with a set pressure value. The difference in the value of the pressures is processed via a PID controller, which sends an adjustment signal to a hydraulic valve for adjusting the difference in the actual and set pressures.

12 Claims, 3 Drawing Sheets

APPARATUS AND METHOD FOR REGULATING THE BALING FORCE IN A SQUARE BALER

BACKGROUND OF THE INVENTION

The present invention relates generally to agricultural machinery and, more particularly, to improvements in balers for harvested crops.

Square balers have a pick-up device, a feeding channel, a baling chamber having side walls, a baling ram, hydraulic adjustment devices to change the position of at least one side wall, and corresponding sensors and monitoring devices which regulate the position of the movable side wall.

A square baler disclosed in European Patent 0 235 397 has a mechanism for controlling the density of the bales by sensing the load on a wall of the baling chamber and increasing the cross-sectional area of the bale chamber when that load exceeds a predetermined value. Sensing is accomplished by measuring the pressure in at least one hydraulic cylinder connected to the baling chamber wall. The disadvantage of the solution described therein is that the device to control the baling pressure cannot be controlled remotely. Furthermore, pressure measuring via a hydraulic cylinder is very costly. In addition, the passive reactions of the hydraulic cylinders operate very slowly and are unsuitable for quickly adjusting the baling pressure.

Sensory devices located at the bailing ram are described in European Patent Application 0 382 263. These sensors supply only an indirect pressure value when the baling ram has arrived at its full stroke position (dead center). During the remaining running time the sensors are unable to collect any pressure information from the baling channel. Depending on the type of harvested crops, these sensors cannot measure the impact the re-expanding crops have on the baling pressure. Therefore these sensing devices deliver incomplete or inaccurate pressure measurements.

An objective of this invention is to provide a system which overcomes these disadvantages.

SUMMARY OF THE INVENTION

In accordance with the present invention there is provided a square baler having a pick-up device, a feeding channel, a baling chamber having side walls at least one of which is movable, a baling ram, a hydraulic adjustment device to change the position of the movable side wall, means for setting a desired pressure value for the hydraulic adjustment device, means for measuring the actual pressure value in the hydraulic adjustment device, and a control device associated with the hydraulic adjustment device for comparing the set and actual pressure values in the hydraulic adjustment device and for adjusting any deviation between the set and actual pressures.

The control means is comprised of an electronic control device with a terminal to pre-set the pressure set value in the hydraulic adjustment device, a sensor to measure the actual pressure in the hydraulic adjustment device, and a PID controller in the electronic control device, which compares the set and actual pressures in the hydraulic adjustment device. If these pressures differ, a control signal is sent to the hydraulic valve to adjust the actual pressure to a level equal to the set pressure. This arrangement, for example, allows the operator of the baler to easily adjust or change the baling pressure of the baler from the tractor seat. This solution is cost-effective and can be implemented with less expensive sensory devices than other solutions. The control device works with accurate pressure values, which can be retrieved directly from the hydraulic adjustment device and can be evaluated quickly.

In accordance with another aspect of the present invention there is provided a bailing method for use in a square baler having a baling chamber with side walls at least one of which is movable, and a hydraulic adjustment device to change the position of the movable side wall; including the steps of: setting a desired pressure value for the hydraulic adjustment device; measuring the actual pressure value in the hydraulic adjustment device; comparing the set and actual pressure values in the hydraulic adjustment device; and when there is a deviation between said pressure values, moving at least one side wall and thereby adjusting the actual pressure value in the hydraulic adjustment device to the set pressure value.

BRIEF DESCRIPTION OF THE DRAWINGS

Reference is now made to the drawings which illustrate the best known mode of carrying out the invention and which show a system and examples for putting the method into practice. The same reference numerals indicate the same or similar parts throughout the several views.

DETAILED DESCRIPTION

Figure 1:
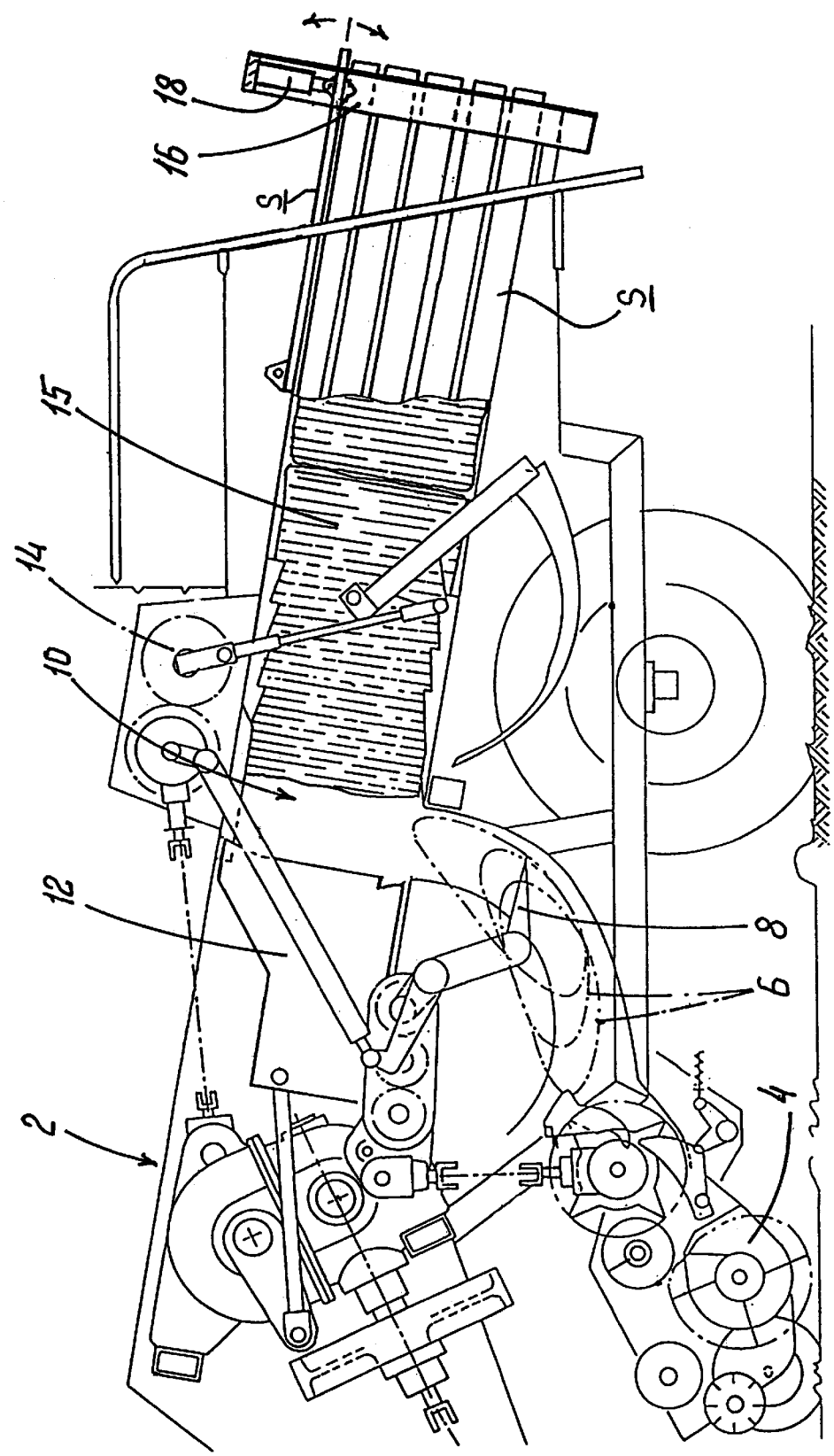
FIG. 1 is a side elevational view of a square baler.

FIG. 1 is a side elevation of a square baler 2. A pick-up device 4 collects harvested crops from the field and transports the crops into the feeding channel 6. The crops are transferred by the feeder 8 from the feeding channel 6 into the baling chamber 10. The baling ram 12 presses the crops against the harvested crop bundle 15 already located in the baling chamber 10. In addition to the baling force which the baling ram 12 exerts against the harvested crop bundles 15, at least one of the side walls S of the baling chamber 10 is pivotably arranged and can be adjusted to exert additional force on the harvested crops. A hydraulic cylinder 18 located on a shaping ring 16 can change the cross-sectional area of the baling chamber 10 in the feeding direction by moving one of the pivotal side walls connected to the hydraulic cylinder 18 (see FIG. 2). By reducing the cross-sectional area of the baling chamber 10, additional baling pressure is applied on the harvested crop bundle 15 located in the baling chamber 10. Once the harvested crop bundle 15 reaches a pre-set length, a binding device 14 is triggered and a completed bale is tied. The completed bale is deposited on the field via a discharge slide (not shown).

Figure 2:
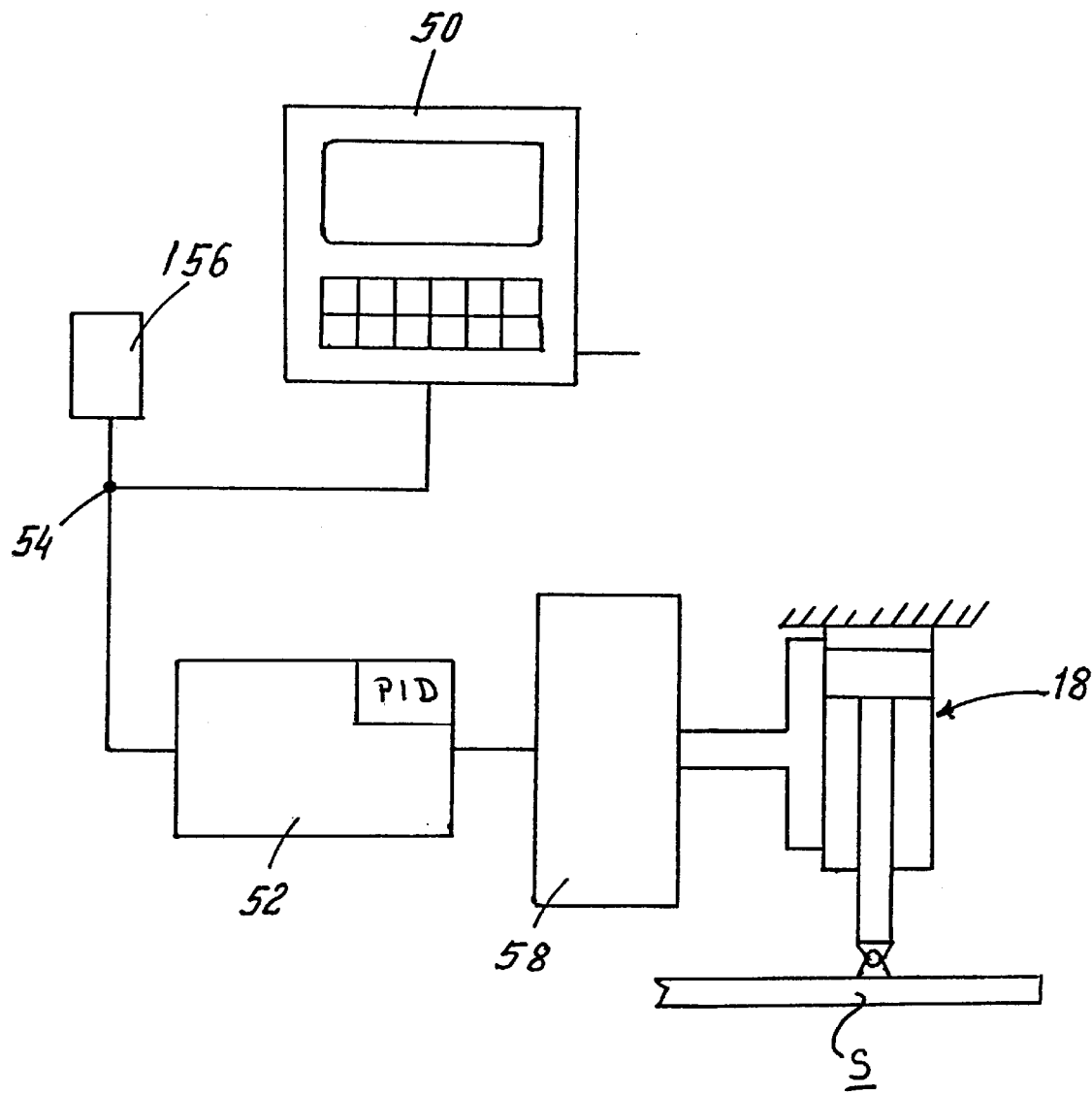
FIG. 2 is a schematic drawing of a control device embodying the present invention.

FIG. 2 schematically shows a preferred embodiment. A pressure set value for the hydraulic adjustment device is programmed at a terminal 50 and is transferred to an electronic control device 52 via wire or telemetrically. The set pressure value may be measured by a sensor 156 at a nodal point 54 and is compared with the actual pressure value in the hydraulic adjustment device 18. How the actual pressure valve is measured is hereinafter described. If the pressure values are equal, the resulting input value in the control device 52 equals zero. However, if there is a positive or negative deviation in the pressures, the deviation's measurement will be processed into a control signal by a PID controller in the electronic control device 52 (see FIG. 2). The processing in the PID controller can be accomplished with electronic components (resistors, transistors, etc.), or suitable software. Inside the PID controller, the value for the deviation will be multiplied by a proportional factor, with an integral, and in case of high value spikes, is computed with a differential. The processed values are collected and are reduced to an output signal and passed on to the hydraulic valve 58 as a correcting variable. Preferably, the electronic control device 52 transmits the control signals in the form of pulse-width signals to control a solenoid valve, hereinafter described. The flow of the hydraulic fluid controlled by the hydraulic valve 58 move the hydraulic adjustment device 18, thereby increasing or decreasing the cross-sectional area of the baling chamber 10.

The design of the individual PID controller should not present any difficulties to an expert familiar with the art; however, the PID controller should be designed so that deviations between the actual pressure value and the set pressure value can be corrected in a reasonable time frame. Ten to twenty seconds would generally be considered a reasonable time frame; however, a reasonable time frame could be shorter or longer, depending upon the requirements of the particular application. The feeding capacity of the hydraulic system as well as the working volume of the hydraulic adjustment device should be considered when selecting the PID controller for a particular application.

Figure 3:
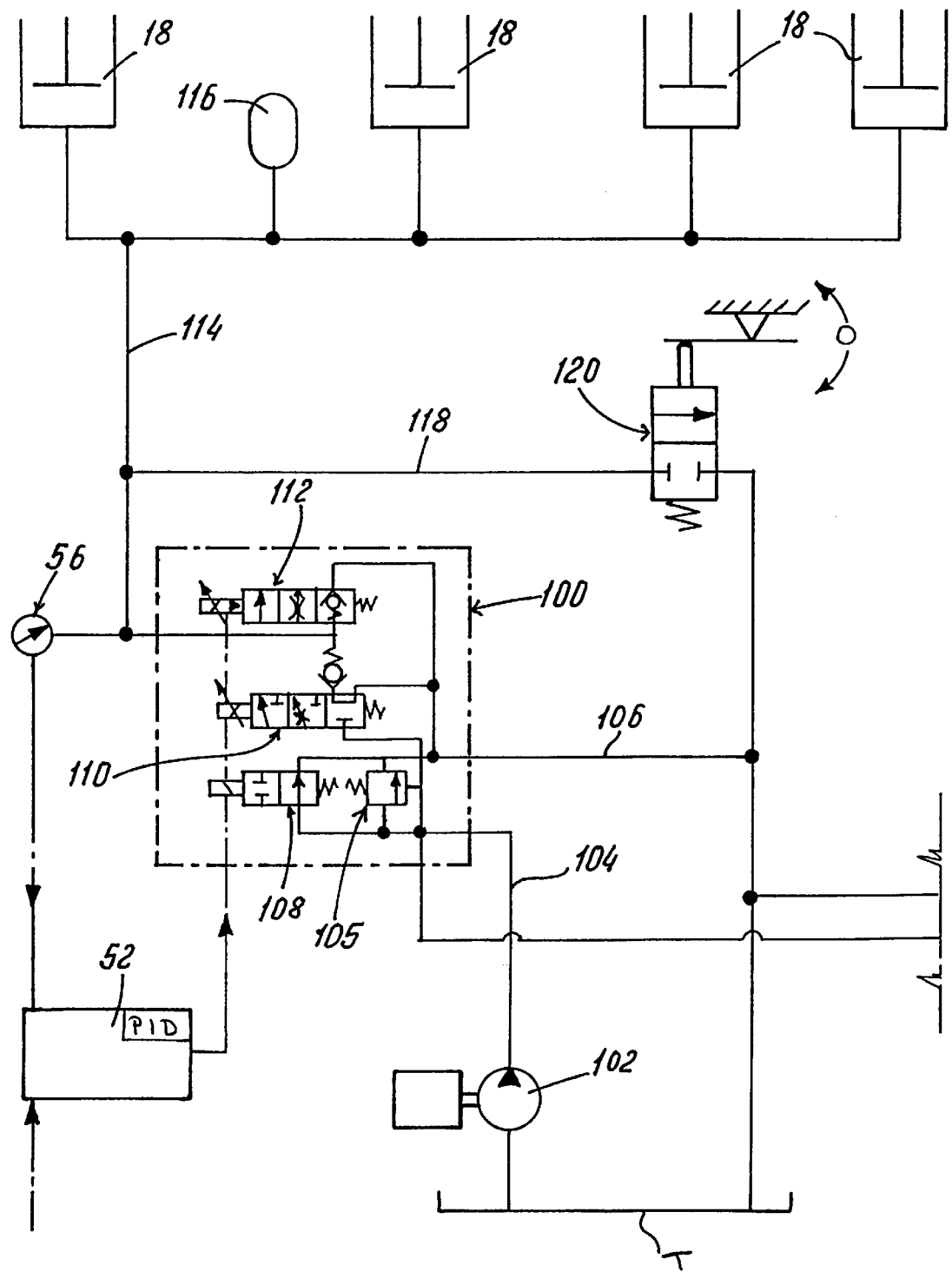
FIG. 3 is a schematic of a hydraulic circuit.

FIG. 3 shows a hydraulic circuit in which a pump 102 supplies a valve block 100 with hydraulic fluid under pressure from a storage tank T through supply line 104. It will be understood that valve block 100 is a preferred embodiment of the above-described hydraulic valve 58. A pressure regulator 105, which can be set to a maximum pressure of, for example, 220 Bar is connected to the supply line 104. When the maximum pressure value is exceeded, the pressure regulator valve 105 drains the excess hydraulic fluid back into the tank T via line 106. A circulation shut-off valve 108 triggers the pressure-less circulation of the hydraulic fluid, provided the other valves are not engaged. When a valve 110 is engaged, the circulation shut-off valve 108 blocks the pressure-less circulation and allows the supply of hydraulic fluids to proceed to valve 110. When valve 110 is engaged, the pressure in the hydraulic adjustment device 18, four of which are shown as an example in FIG. 3, is increased by a supply and discharge line 114. When a valve 112 is engaged, hydraulic fluid is drained via line 106 back into the tank T and the hydraulic pressure in the hydraulic adjustment device 18 decreases. In order to adsorb a shock to the control device, a hydraulic accumulator 116 with, for example, a pressure of 30 Bar is connected before line 114. In addition, the pressure sensor 56, which transfers the collected actual pressure values to the electronic control device 52, is connected to line 114. A valve 120 is connected with line 114 via line 118. In case of sagging of the brace (not shown) holding the hydraulic adjustment device 18, the valve 120 is mechanically triggered via a lever. When engaged, the valve 120 drains the hydraulic fluid via line 106 back to the tank T. As shown in FIG. 3, associated with valves 108, 110 and 112 are solenoids which receive adjusting signals from the electronic control device 52 which thereby regulates the position of the valves. Solenoid controlled valves 108, 110 and 112 are controlled either as proportional valves with a constant current or as pulse-width modulated valves.

Other objects, features and advantages will be apparent to those skilled in the art. While the present invention has been described by reference to a preferred embodiment, it should be understood that modifications and variations of the invention may be constructed without departing from the scope of the invention.

I claim:

1. In a square baler having a pick-up device, a feeding channel, a baling chamber having side walls least one of which is movable, a baling ram, and a hydraulic adjustment device to change the position of the movable side wall; the improvement comprising:

means for setting a desired pressure value for the hydraulic adjustment device;

means for measuring an actual pressure value in the hydraulic adjustment device;

a hydraulic control valve for adjusting the actual pressure in the hydraulic adjustment device; and a control device associated with the hydraulic adjustment device and including a PID controller for comparing the set desired pressure value and the actual pressure value in the hydraulic adjustment device and, when there is a deviation therebetween, for triggering a regulating signal to the hydraulic control valve for adjusting any deviation between the set desired and actual pressures.

2. A square baler according to claim 1, wherein said means for measuring the actual pressure comprises a pressure sensor.

3. A square baler according to claim 1, including a solenoid associated with the hydraulic control valve for controlling pressure; and wherein said solenoid is controlled by the PID controller via a pulse-width modulation.

4. In a square baler having a pick-up device, a feeding channel, a baling chamber having side walls at least one of which is movable, a baling ram, and a hydraulic adjustment device to change the position of the movable side wall; the improvement comprising:

means for setting a desired pressure value for the hydraulic adjustment device;

means for measuring an actual pressure value in the hydraulic adjustment device; and a control device associated with the hydraulic adjustment device for comparing the desired pressure value and the actual pressure value in the hydraulic adjustment device and for adjusting any deviation between the set and actual pressures, said control device including electronic control means with a terminal for pre-setting the set desired pressure value in the hydraulic adjustment device.

5. A square baler according to claim 4, including a hydraulic control valve for adjusting the actual pressure in the hydraulic adjustment device; and wherein said electronic control means includes a PID controller for comparing the set and actual pressure values and, when there is a deviation therebetween, for triggering a regulating signal to the hydraulic control valve.

6. A square baler according to claim 4, wherein the set desired pressure value can be pre-programmed at the terminal between 0 and 210 Bar.

7. A square baler having a pick-up device; a feeding channel; a baling chamber having a plurality of movable side walls; a baling ram; a plurality of hydraulic adjustment devices to change the position of the movable side walls; means for setting a desired pressure value for the hydraulic adjustment devices; means for measuring an actual pressure value in the hydraulic adjustment devices; an electronic control device associated with the hydraulic adjustment devices for comparing the set desired pressure and actual pressure values in the hydraulic adjustment devices and for adjusting any deviation therebetween; and the electronic control device also operative for controlling each of the plurality of hydraulic adjustment devices for selectively changing the position of the movable side walls.

8. A square baler according to claim 7, including a plurality of electronic actuators under control of the electronic control device and each associated with one hydraulic adjustment device for selective changing the position of the respective movable side wall.

9. In a square baler having a pick-up device, a feeding channel, a baling chamber having side walls at least one of which is movable, a baling ram, and a hydraulic adjustment device to change the position of the movable side wall; the improvement comprising:

means for setting a desired pressure value for the hydraulic adjustment device;

means for measuring an actual pressure value in the hydraulic adjustment device; and a control device associated with the hydraulic adjustment device for comparing the set desired and actual pressure values in the hydraulic adjustment device and transmitting a signal for adjusting any deviation therebetween; said control device, when transferring an overload signal, being operative for automatically lowering the pressure in the hydraulic adjustment device.

10. A square baler according to claim 9, including a pressure line connected to the hydraulic adjustment device; and an accumulator connected to the pressure line.

11. In a square baler having a pick-up device, a feeding channel, a baling chamber having side walls at least one of which is movable, a baling ram, and a hydraulic adjustment device to change the position of the movable side wall; the improvement comprising:

means for setting a desired pressure value for the hydraulic adjustment device;

means including a pressure sensor for measuring an actual pressure value in the hydraulic adjustment device; the pressure sensor being constructed and arranged so that it is adjustable to values between 0 and 250 Bar; and a control device associated with the hydraulic adjustment device for comparing the desired and actual pressure values in the hydraulic adjustment device and for adjusting any deviation between the desired and actual pressures.

12. A baling method for use in a square baler having a baling chamber with side walls at least one of which is movable, and a hydraulic adjustment device to change the position of the movable side wall; including the steps of:

setting a desired pressure value for the hydraulic adjustment device;

measuring an actual pressure value in the hydraulic adjustment device;

comparing the set desired and actual pressure values in the hydraulic adjustment device; and when there is a deviation between said pressure values, moving at least one side wall and thereby adjusting the actual pressure value in the hydraulic adjustment device to the set pressure value; and when there is an overload, automatically lowering the pressure in the hydraulic adjustment device.

* * * * *